(12) United States Patent
Jabcon

(10) Patent No.: US 6,488,050 B1
(45) Date of Patent: Dec. 3, 2002

(54) PNEUMATIC VALVE ASSEMBLY

(75) Inventor: Leonard J. Jabcon, Kalamazoo, MI (US)

(73) Assignee: Humphrey Products Company, Kalamazoo, MI (US)

( * ) Notice: Subject to any disclaimer, the term of this patent is extended or adjusted under 35 U.S.C. 154(b) by 0 days.

(21) Appl. No.: 09/902,182

(22) Filed: Jul. 10, 2001

(51) Int. Cl.[7] .................. F15B 13/044; F16K 31/06
(52) U.S. Cl. ................ 137/625.65; 137/625.27; 251/129.07; 251/129.17; 251/333
(58) Field of Search ............. 137/625.27, 625.65; 251/129.07, 129.17, 333

(56) References Cited

U.S. PATENT DOCUMENTS

| | | | | |
|---|---|---|---|---|
| 3,027,134 A | * | 3/1962 | Nichols | 251/333 |
| 4,382,452 A | | 5/1983 | Loveless | 137/625.43 |
| 4,494,572 A | | 1/1985 | Loveless | 137/596.17 |
| 4,501,299 A | | 2/1985 | Klimowicz et al. | 137/625.65 |
| 4,524,807 A | | 6/1985 | Toliusis | 137/884 |
| 4,823,842 A | | 4/1989 | Toliusis | 137/625.65 |
| 4,915,134 A | | 4/1990 | Toliusis et at. | 137/625.65 |
| 4,971,115 A | | 11/1990 | Tinholt | 137/625.65 |
| 5,211,198 A | | 5/1993 | Tinholt | 137/625.27 |
| 5,332,000 A | * | 7/1994 | Gassner | 251/333 |

* cited by examiner

Primary Examiner—Gerald A. Michalsky
(74) Attorney, Agent, or Firm—Van Dyke, Gardner, Linn & Burkhart, LLP

(57) ABSTRACT

An electrically-operated plunger-type valve assembly includes a housing, an electromagnetic actuator and a plunger assembly, which is positioned in the housing and supported for movement in the housing. The valve assembly includes a biasing member, which applies a force to the plunger assembly to close the communication between inlet and outlet ports to thereby close the valve assembly. The actuator generates a magnetic field to move the plunger assembly against the biasing member force to move the plunger assembly to control the valve. The plunger assembly includes a seal that seals the communication passage to close the valve when the plunger assembly is moved to its closed position. Pressurized fluid in the inlet port causes the seal to radially seal against the communication passage, which reduces the required biasing member spring force and reduces the energy needed to move the plunger assembly.

43 Claims, 16 Drawing Sheets

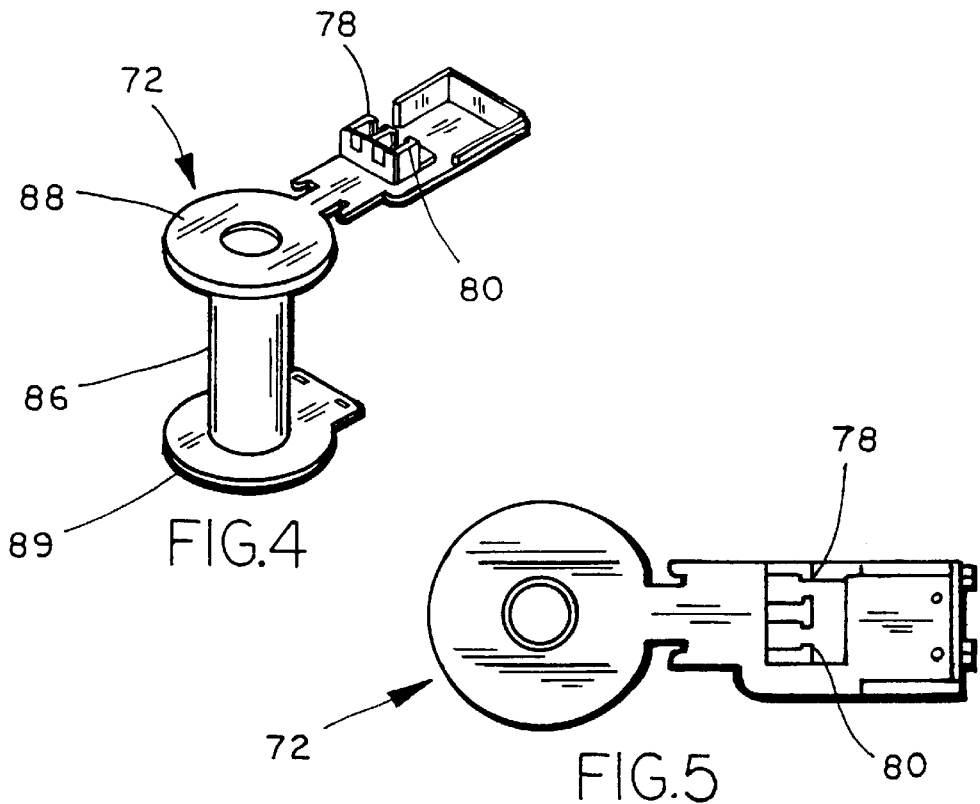
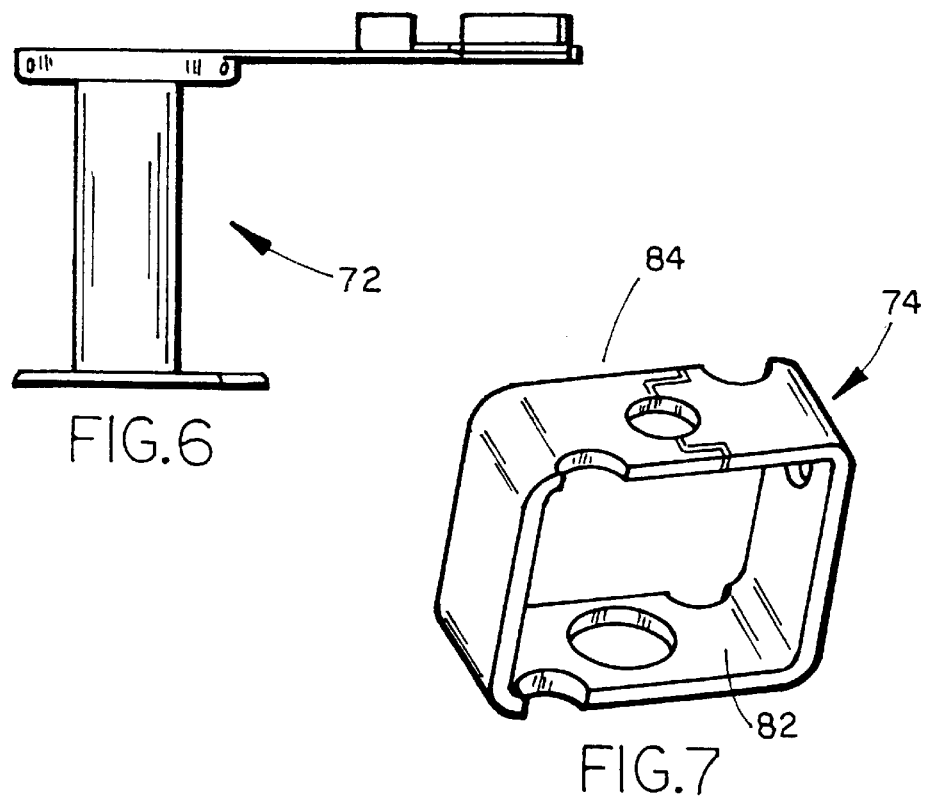

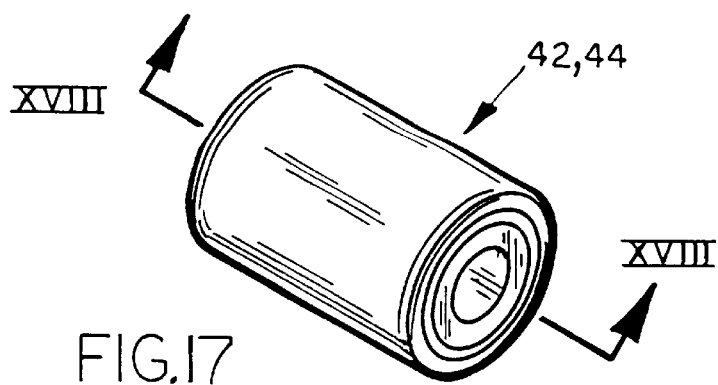
FIG.17
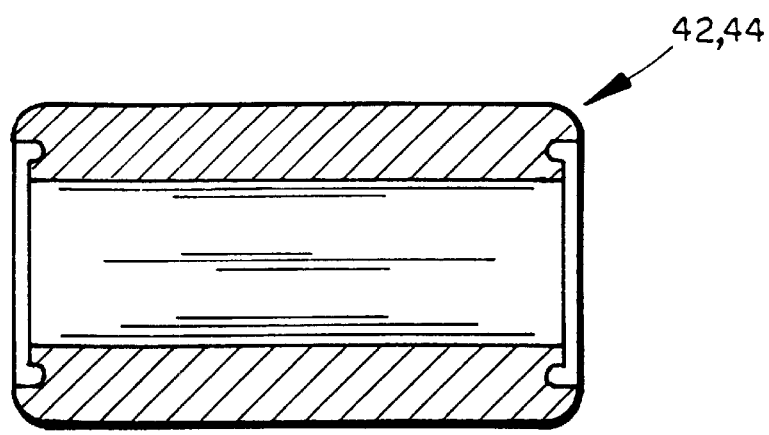
FIG.18
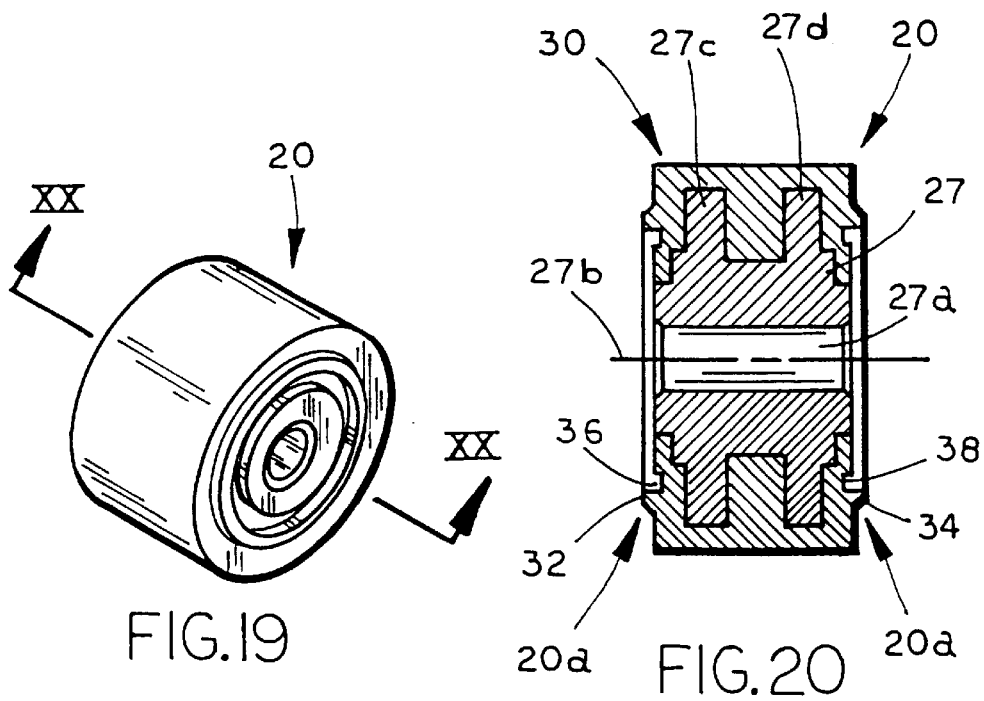
FIG.19
FIG.20

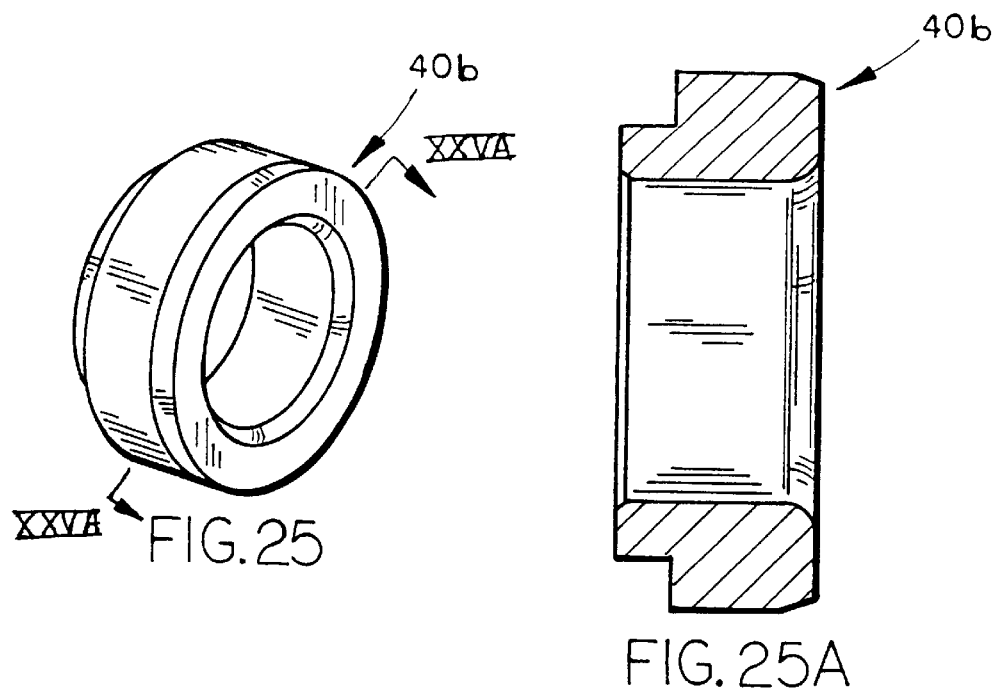
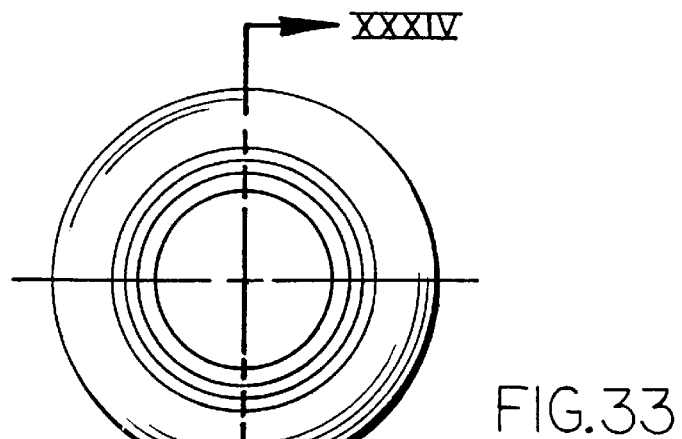
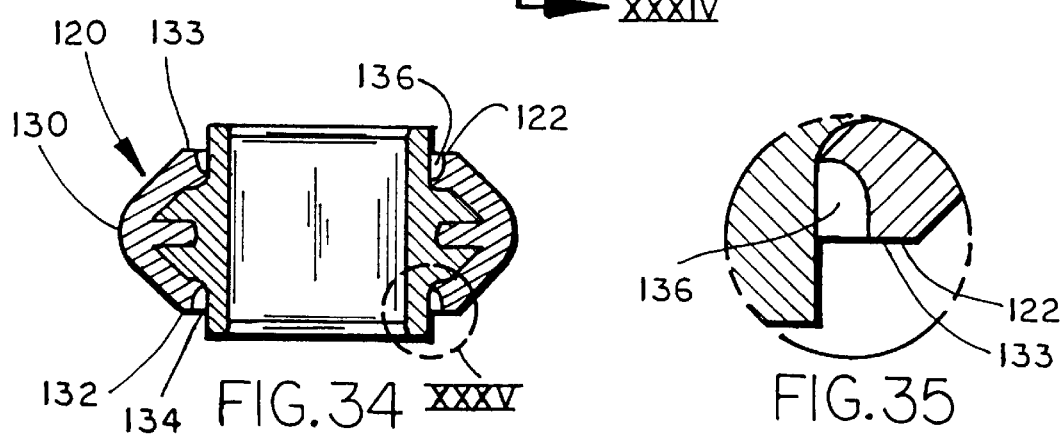

PNEUMATIC VALVE ASSEMBLY

TECHNICAL FIELD AND BACKGROUND OF THE INVENTION

The present invention relates to a pneumatic valve and, more particularly, to an electrically-operated pneumatic valve incorporating a poppet seal.

Conventional electrically-operated plunger-type valves include a housing with a transverse passage formed therein, which is in communication with a primary or inlet port, a secondary or outlet port, and a discharge or exhaust port. A plunger is received in the transverse passage of the housing for movement along the passage, with the movement of the plunger controlling the communication between the ports and, thereby, opening and closing the valve. The plunger is moved by an electromagnetic actuator, which is also mounted in the housing. When an electric current is applied to the electromagnetic actuator, an electromagnetic field is generated which moves the plunger along the transverse passage to vary the communication between the ports. Positioned between the plunger and the fixed seat of the valve, is a poppet which seals against the valve seat to control the flow of fluid through the valve.

The mechanism for sealing a conventional poppet in its closed position is to use a heavy spring force to compress the poppet against the mating fixed valve seat with enough force to overcome the force of the compressed air that is trying to push its way between the poppet and the valve seat. The main disadvantage to this method is it takes a relatively large amount of electrical energy to generate a magnetic force sufficient to overcome the heavy spring force when it is desired to open the valve. The greater the spring force, the greater the electrical energy that is required to operate the valve. A disadvantage of these energy requirements is an undesirable heat byproduct when the valve is in operation. This is particularly problematic when the valve is used near electronic devices, which are sensitive to heat.

Consequently, there is a need for an electrically-operated plunger-type valve which can operate while consuming less power than conventionally known solenoid valves so that the valve can be used in a heat sensitive environment.

SUMMARY OF THE INVENTION

The present invention provides a valve assembly which consumes less power than conventionally known poppet design valves. Furthermore, the present invention provides a valve assembly which can achieve higher flow rates than conventionally known poppet designs.

In one form of the invention, an electrically-operated plunger-type valve assembly includes a housing, an electromagnetic actuator which is positioned in an interior chamber of the housing, and a plunger assembly also positioned in the interior chamber of the housing. The plunger assembly is supported for reciprocal axial movement in the interior chamber between a first position and a second position. The housing includes an inlet port and an outlet port, and a communication passage between the inlet port and the outlet port. The communication passage is open to permit communication between the inlet port and the outlet port when the plunger assembly is moved to its first position thereby opening the valve assembly. When the plunger assembly is moved to its second position, the communication passage is closed between the inlet port and the outlet port whereby the valve assembly is closed. The valve assembly also includes a biasing member which applies a spring force to the plunger assembly to urge the plunger assembly to its second position, with the electromagnetic actuator selectively generating a magnetic field having sufficient magnitude to move the plunger assembly against the force of the biasing spring to move the plunger assembly to its first position when the electromagnetic actuator is energized to selectively move the plunger assembly between its first and second positions to control the communication between the inlet port and the outlet port. The plunger assembly has a seal member which seals the communication passage to close communication between the inlet port and the outlet port when the plunger assembly is moved to its second position. The seal member is acted upon by pressurized fluid in the inlet port to radially seal against the communication passage whereby the spring force of the biasing member can be reduced which in turn reduces the amount of energy needed to move the plunger assembly between its first and second positions.

In one aspect, the seal member includes a projecting member, which radially sealingly engages the communication passage to close communication between the inlet port and the outlet port when the plunger assembly is moved to its second position. In a further aspect, the projecting member deflects radially outward to sealingly engage the communication passage. For example, the projecting member may comprise an annular lip.

In another aspect, the housing further includes an exhaust port, with the communication passage extending between inlet port, the outlet port, and the exhaust port. The seal member sealingly engages a first portion of the communication passage when the plunger assembly is in the first position to seal off the exhaust port and open communication between the inlet port and the outlet port to thereby open the valve assembly. The seal member sealingly engages a second portion of the communication passage when the plunger assembly is in its second position to seal off communication between the inlet port and the outlet port.

In a further aspect, the seal member comprises a unitary seal and includes a first sealing surface for sealingly engaging the first portion and a second sealing surface for sealingly engaging the second portion. Furthermore, at least one of the sealing surfaces comprises a projecting lip. In a preferred form, both the first and second sealing surfaces comprise projecting lips.

According to another form of the invention, an electrically-operated plunger-type valve assembly includes a housing, an electromagnetic actuator which is positioned in an interior chamber of the housing, and a plunger assembly which is also positioned in the interior chamber and supported for reciprocal axial movement in the interior chamber between a first position and a second position. The interior chamber includes communication passages between an inlet port, an outlet port, and an exhaust port. When the plunger assembly is moved to the first position, the communication passage between the inlet port and the outlet port is open thereby opening the valve assembly. When the plunger assembly is moving to its second position, the communication passages between the inlet port and the outlet port and the exhaust port are open. When the plunger assembly is moved to its second position, the communication passages between the inlet port and the outlet port and the exhaust port are closed. The valve assembly also includes a biasing member which applies a spring force to the plunger assembly to urge the plunger assembly to its second position. The electromagnetic actuator generates a magnetic field having sufficient magnitude to move the plunger assembly against the force of the biasing member to move the plunger assembly to its first position when the electromagnetic actuator is energized to selectively move the plunger assembly between its first and second positions to control opening and closing of the valve assembly. The plunger assembly has a sealing member with first and second sealing surfaces for sealing the communication passage when in its first and second positions, respectively. At least the second sealing surface radially sealingly engages the communication passage and is acted upon by pressurized fluid in the inlet port to radially seal against the communication passage whereby the spring force of the biasing member can be reduced which in turn reduces the amount of energy need to move the plunger assembly between its first and second positions.

In one aspect, at least one of the sealing surfaces comprises a flexible lip. In a further aspect, second sealing surface comprises a flexible lip. In a further aspect, the flexible lip deflects radially outward to sealingly engage the second portion of the communication passage. In yet a further aspect, the sealing member includes an annular groove radially inward of the flexible lip whereby the pressure of the pressurized fluid enters the annular groove to urge the second sealing surface to deflect radially outward to sealingly engage the second portion of the communication passage. In this manner, a seal between the sealing member and the communication passage can be achieved with a lower spring force, thereby reducing the power requirements of the valve assembly.

These and other objects, advantages, purposes, and features of the invention will become more apparent from the study of the following description taken in conjunction with the drawings.

DETAILED DESCRIPTION OF THE DRAWINGS

FIG. 4 is a perspective view of the coil bobbin in FIGS. 2 and 3;

FIG. 5 is a top plan view of the bobbin of FIG. 4;

FIG. 6 is a side view of the bobbin of FIGS.4 and 5;

FIG. 7 is a perspective view of the coil frame of FIGS. 2 and 3;

FIG. 17 is a perspective view of one diaphragm retainer of FIGS. 2 and 3;

FIG. 18 is a cross-section view taken along line XVII—XVII of FIG. 17;

FIG. 19 is a perspective view of the poppet of FIGS. 2 and 3;

FIG. 20 is cross-section view taken along line XX—XX of FIG. 19;

FIG. 25 is a perspective view of a lower diaphragm retainer;

FIG. 25A is a cross-section view taken along line XXVA—XXVA of FIG. 25;

FIG. 33 is a plan view of the poppet of FIG. 32;

FIG. 34 is a cross-section taken along line XXXIV—XXXIV of FIG. 33; and

FIG. 35 is an enlarged detail of the flexible lip in FIGS. 33–34.

DETAILED DESCRIPTION OF THE PREFERRED EMBODIMENTS

Figure 1:
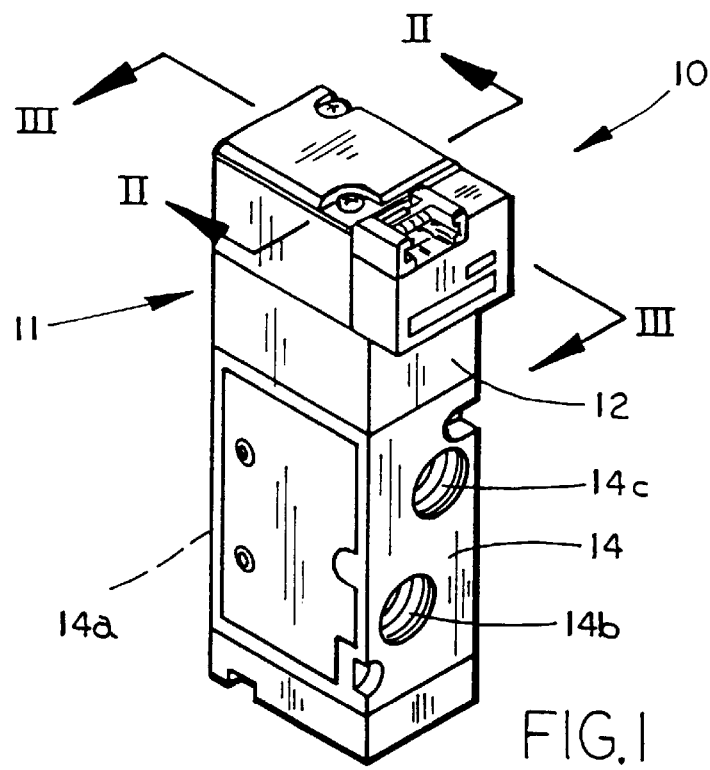
FIG. 1 is a perspective view of a plunger-type valve assembly incorporating a poppet of the present invention.
Figure 1A:
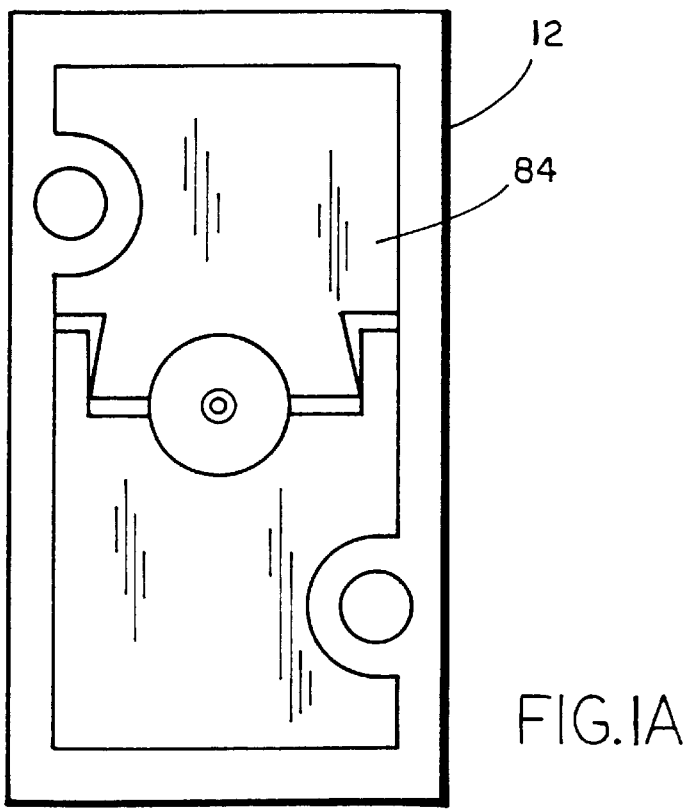
FIG. 1A is a top plan view of the valve assembly of FIG. 1 with the top cover removed.
Figure 2:
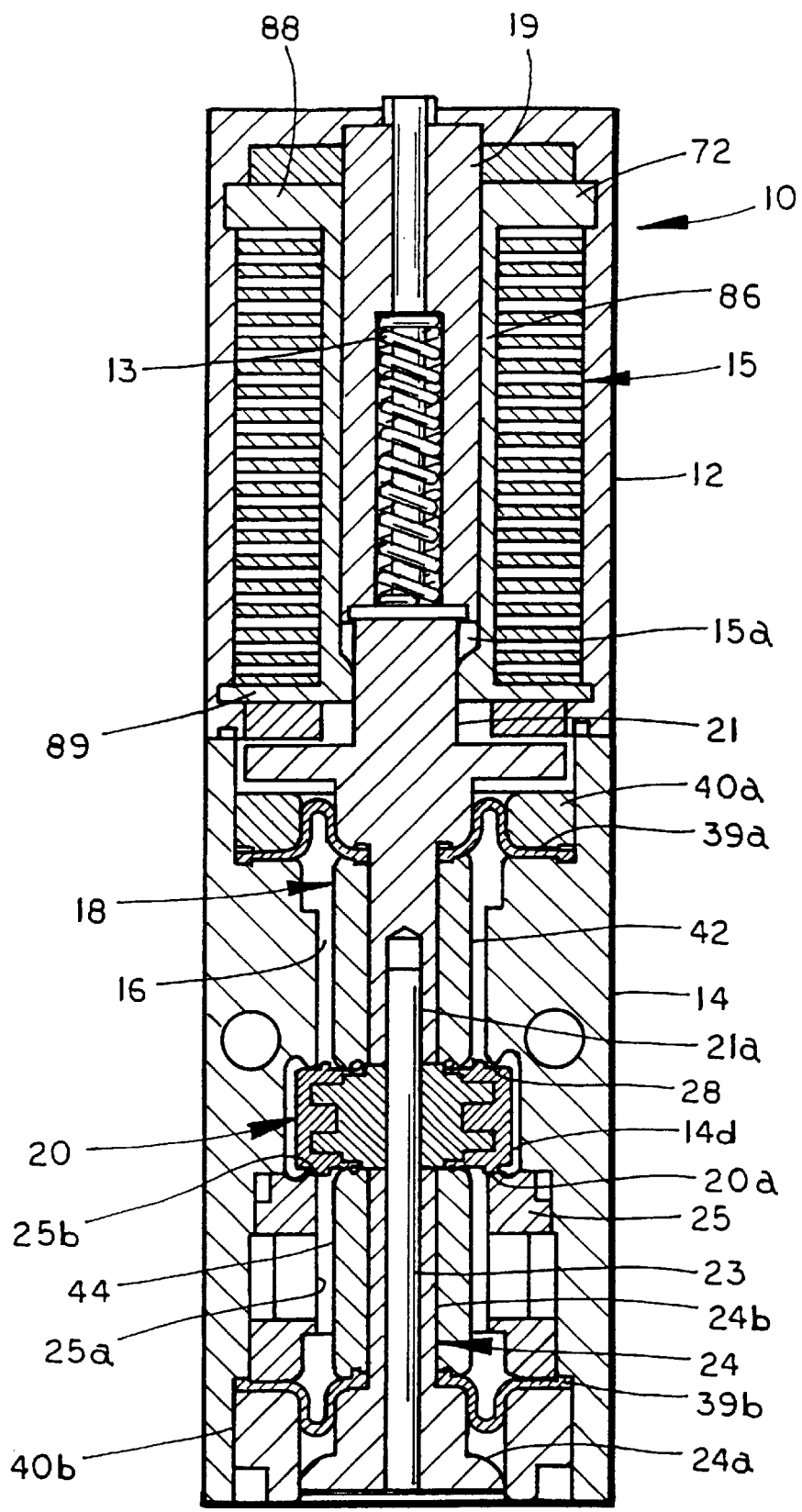
FIG. 2 is a cross-section view taken along line II—II of FIG. 1.
Figure 3:
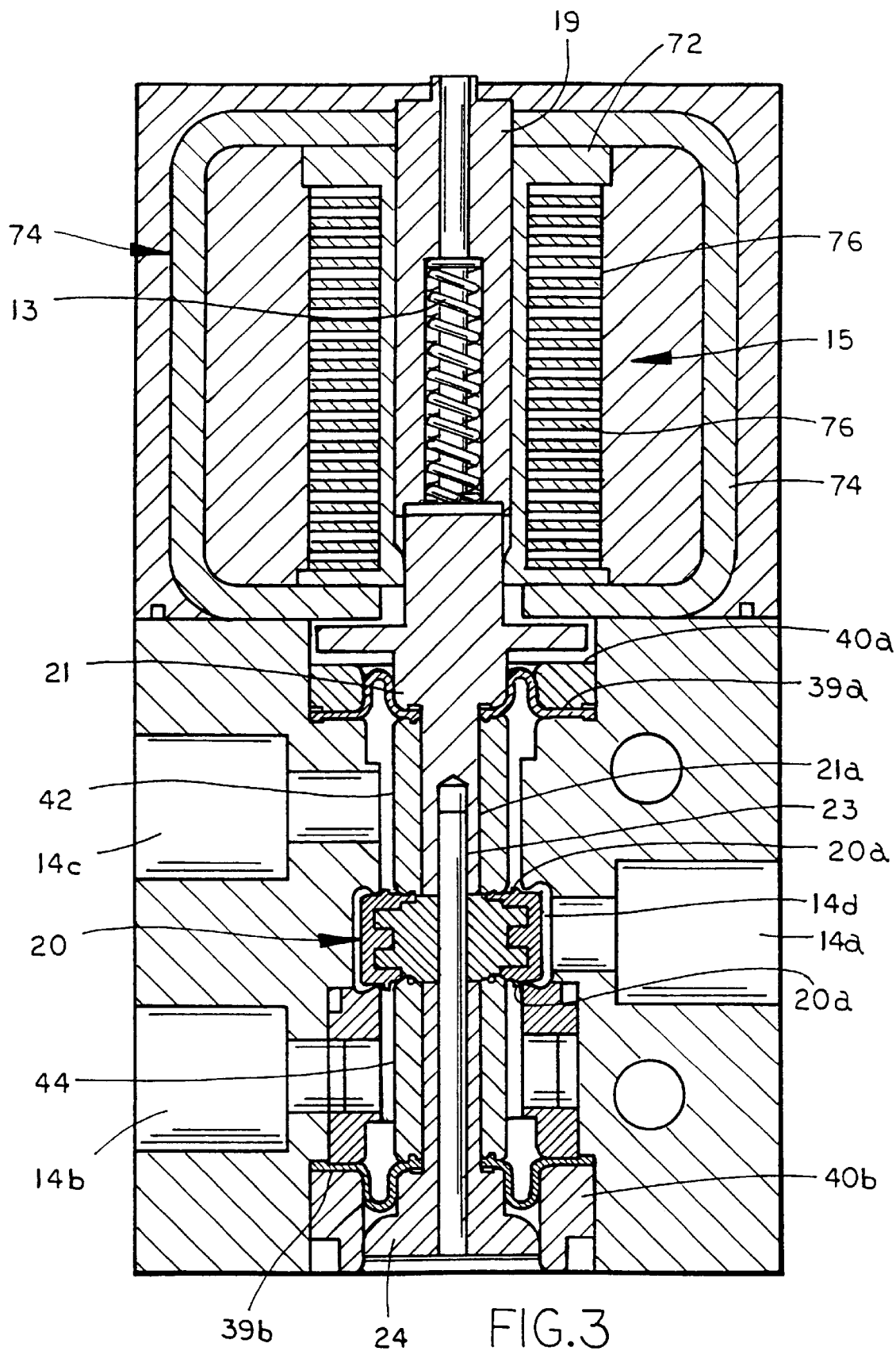
FIG. 3 is a cross-section view taken along line III—III of FIG. 1.
Figure 8:
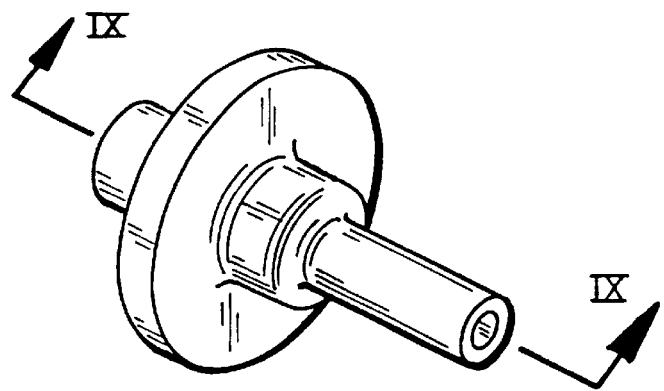
FIG. 8 is a perspective view of the armature of FIGS. 2 and 3.
Figure 9:
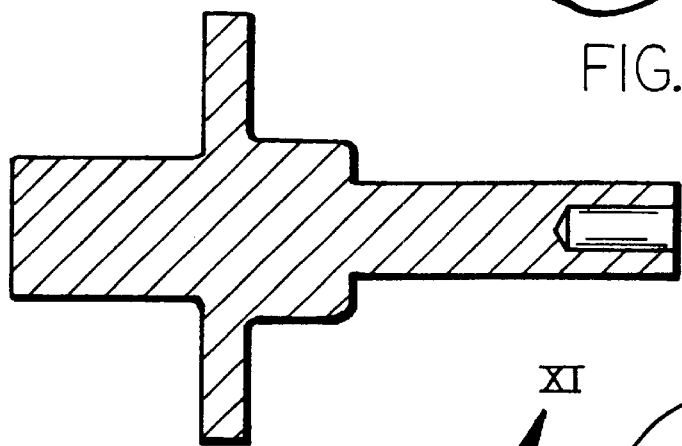
FIG. 9 is a cross-section view taken along line IX—IX of FIG. 8.
Figure 10:
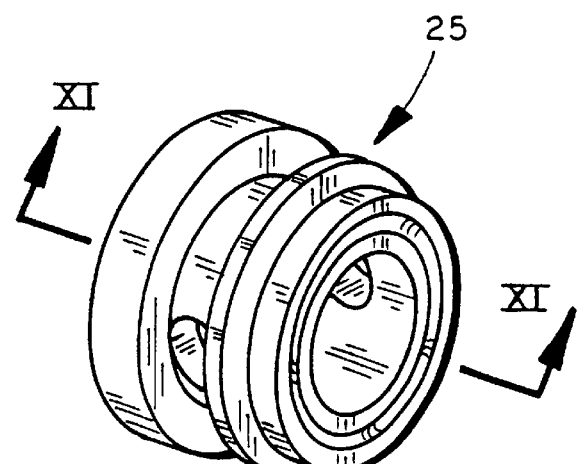
FIG. 10 is a perspective view of the valve seat insert.
Figure 11:
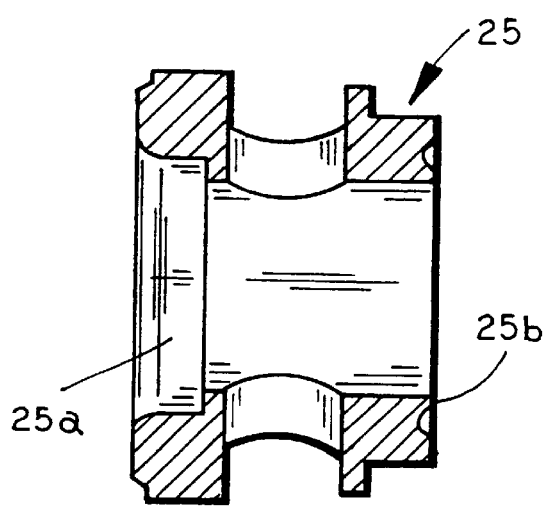
FIG. 11 is a cross-section view taken along line XI—XI of FIG. 10.
Figure 12:
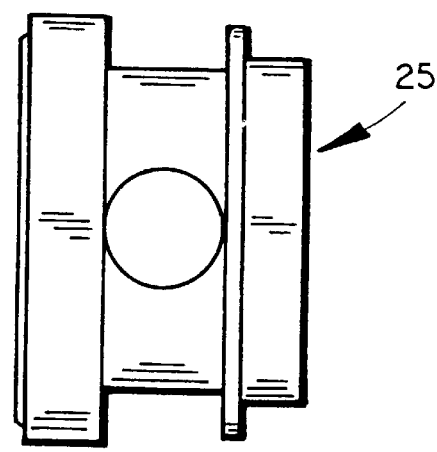
FIG. 12 is a elevation view of the valve seat of FIG. 10.

Referring to FIGS. 1–3, the numeral 10 generally designates an electrically operated plunger-type valve assembly of the present invention. Valve assembly 10 includes a housing 11 formed from an upper housing 12 and a lower housing or base 14. Extending through base 14 is a transverse passage or interior chamber 16, which includes an inlet port 14b, an outlet port 14a, an exhaust port 14c, and a valve seat cavity 14d. Positioned in transverse passage 16 is a plunger assembly 18, which includes a poppet 20 that is selectively moved to open and close communication between inlet port 14b and outlet port 14a to open and close valve assembly 10. Upper housing 12 includes a biasing member 13, such as a coil spring, which urges plunger assembly 18 downward (as viewed in FIG. 3) to close valve assembly 10, and an electromagnetic actuator 15, which when actuated generates an electromagnetic field that overcomes the spring force in biasing member 13 and moves plunger assembly 18 upward (as viewed in FIG. 3) to open valve assembly 10 and, thereby, selectively control the operation of valve assembly 10. As will be more fully described below, poppet 20 incorporates a flexible sealing lip 20a that allows poppet 20 to seal radially in transverse passage 16, which achieves an effective seal with less spring force than the spring forces normally required to seal a conventional plunger assembly. Furthermore, the air pressure within the valve assembly operates on sealing lip 20a to assist in the radial sealing function of the poppet.

Referring again to FIGS. 2 and 3, plunger assembly 18 includes an armature 21 and an armature extension pin 23, which extends into and mounts in the lower cylindrical end 21a of armature 21 (as viewed in FIGS. 2 and 3). Armature 21 is formed from a metal material and includes an upper portion that extends into the transverse sleeve 15a of electromagnetic actuator 15 in a center post 19 (FIGS. 21 and 22) so that when the electromagnetic field is generated, armature 21 moves axially upward (as viewed in FIGS. 2 and 3) with respect to housing 11. Biasing member 13 is also positioned in sleeve 15a and applies a downward spring force (as viewed in FIG. 3) to armature 21 to urge plunger assembly 18 to move to its closed position.

Figure 13:
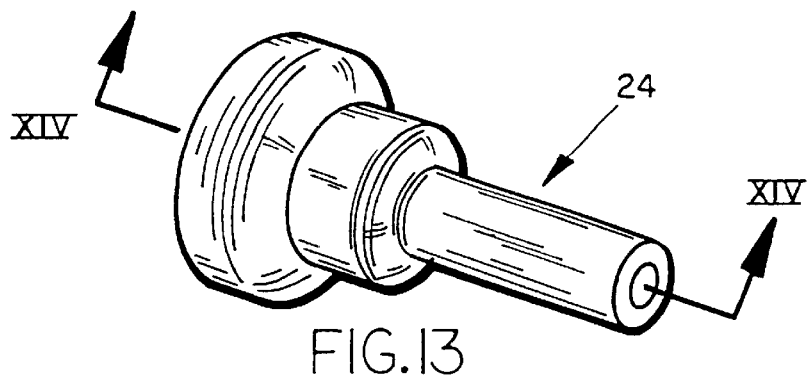
FIG. 13 is a perspective view of the poppet retainer of FIGS. 2 and 3.
Figure 14:
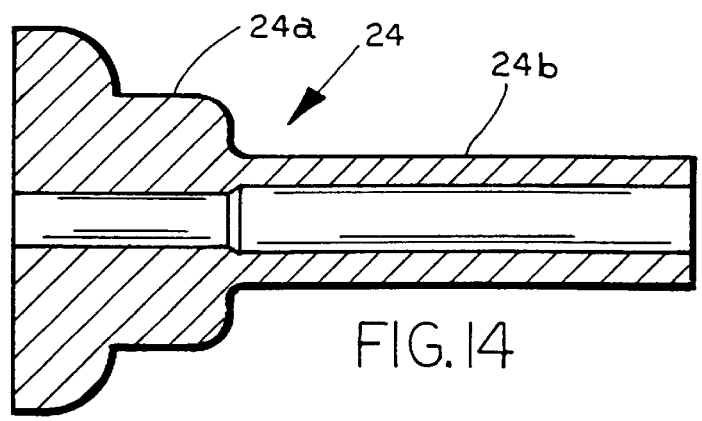
FIG. 14 is a cross-section view taken along line XIV—XIV of FIG. 13.
Figure 15:
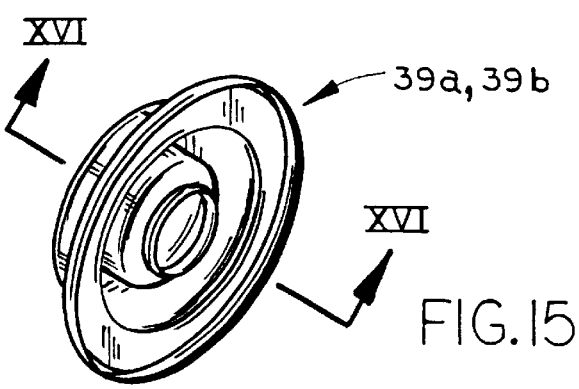
FIG. 15 is a perspective view of one diaphragm of FIGS. 2 and 3.
Figure 16:
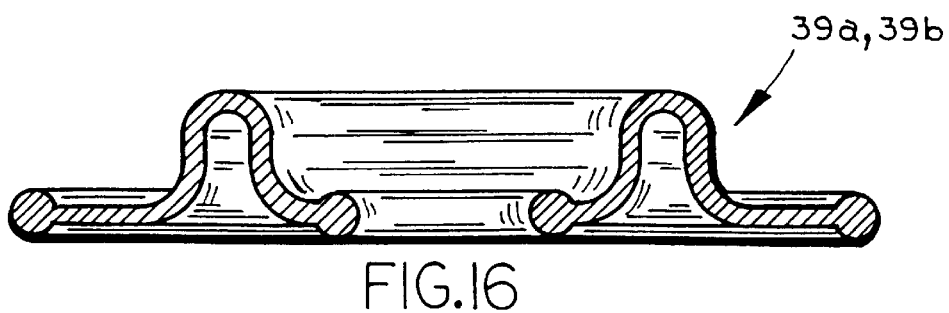
FIG. 16 is a cross-section taken along line XVI—XVI of FIG. 15.

Poppet 20 is retained on extension pin 23 by a retainer 24 so that when armature 21 is moved by actuation of actuator 15 or under the spring force of biasing member 13, poppet 20 moves axially through transverse passage 16. As best seen in FIGS. 13 and 14, retainer 24 includes an enlarged base 24a and an extended cylindrical sleeve 24b, which extends over and is mounted on to pin 23 to thereby capture poppet 20 therebetween.

As best seen in FIGS. 27–30, valve seat cavity 14d includes an upper annular ridge 28. Poppet 20 bears and compresses against ridge 28 when plunger assembly 18 is moved upward (in reference to FIGS. 27–30) to thereby seal off exhaust outlet 14c and to open the communication between inlet port 14b and outlet port 14a thereby opening valve assembly 10. Positioned in valve seat cavity 14d is a valve seat insert 25 which includes a transverse passage 25a and an annular ridge 25b against which poppet 20 bears and compresses to seal transverse passage 25a to close communication between inlet port 14b and outlet port 14a thereby closing valve assembly 10.

Figure 21:
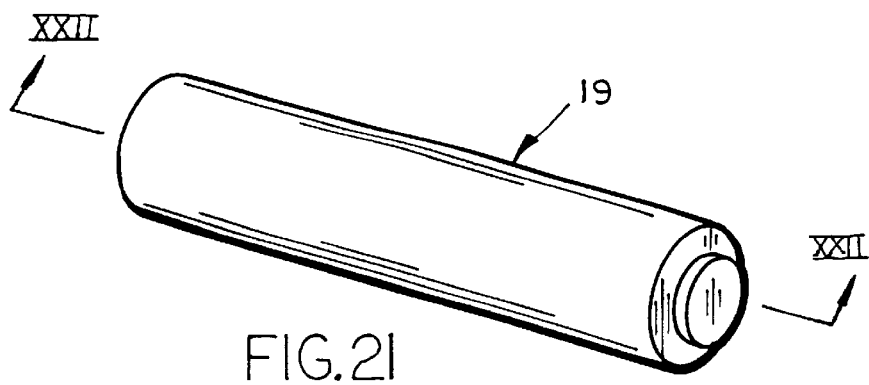
FIG. 21 is a perspective view of the center post of the valve of FIGS. 2 and 3.
Figure 22:
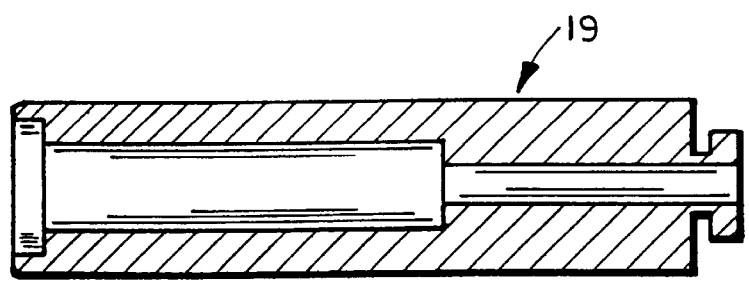
FIG. 22 is a cross-section view taken along line XXII—XXII of FIG. 21.
Figure 23:
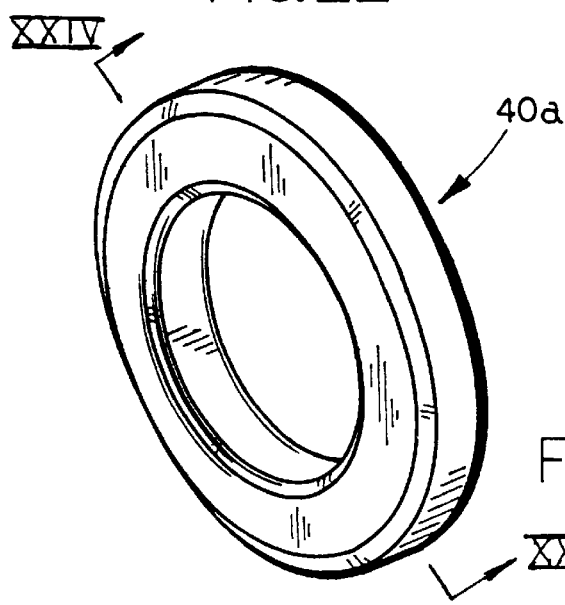
FIG. 23 is a perspective view of an upper diaphragm retainer.
Figure 24:
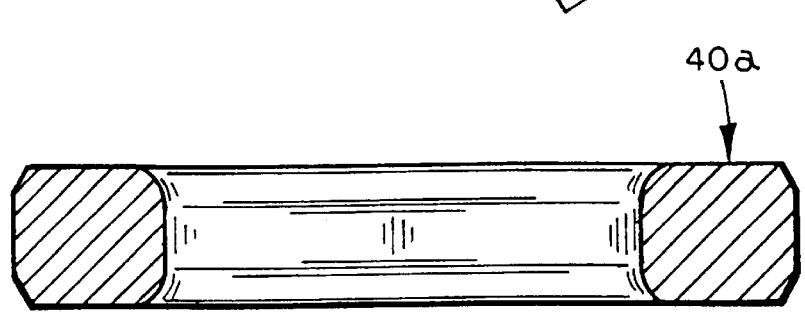
FIG. 24 is a cross-section view taken along line XXIV—XXIV of FIG. 23.
Figure 26:
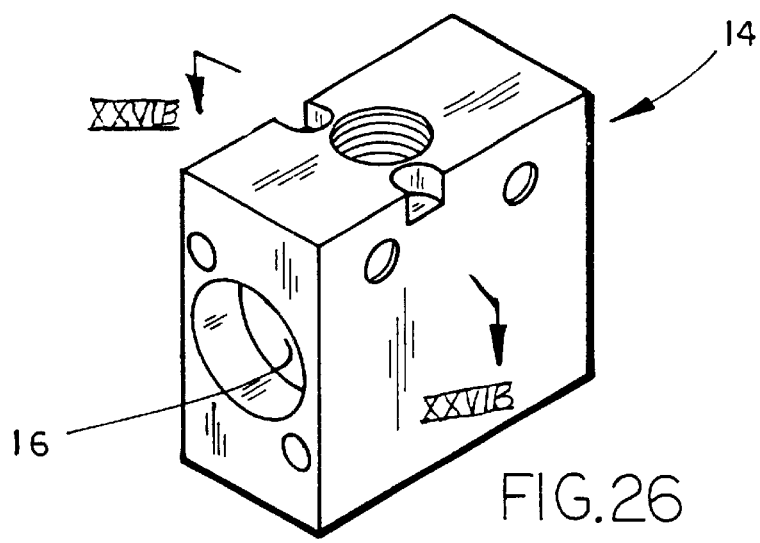
FIG. 26 is a bottom perspective view of a base or inline body of the valve assembly of FIG. 1.
Figure 26A:
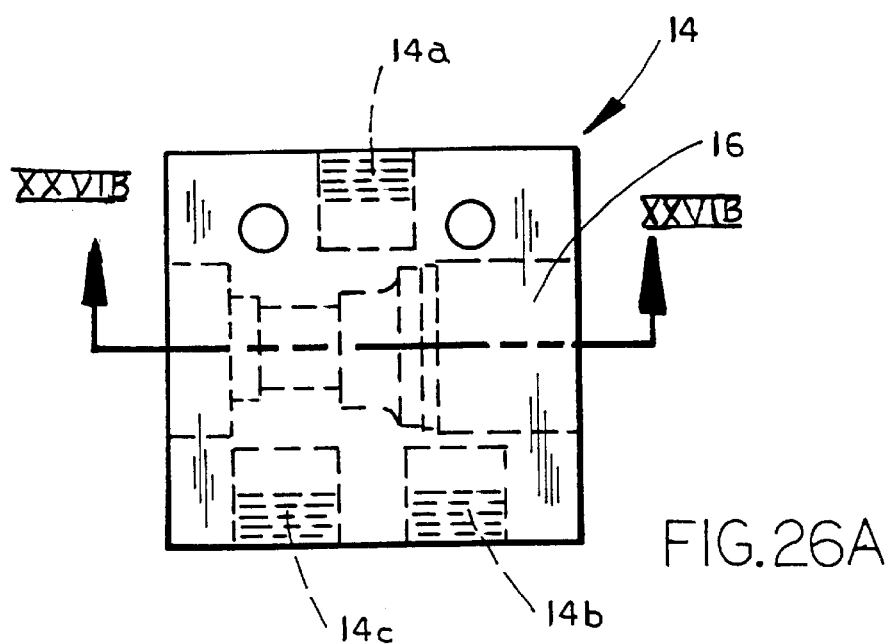
FIG. 26A is a side view of the base of FIG. 26.
Figure 26B:
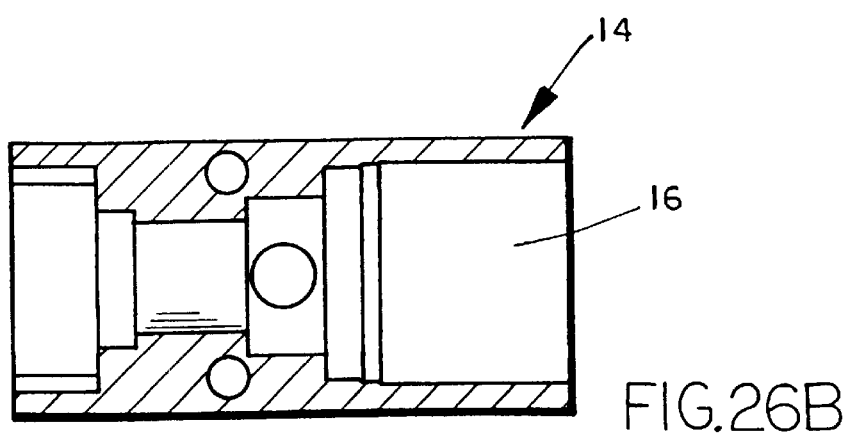
FIG. 26B is a cross-section view taken along line XXVIB—XXVIB of FIG. 26.
Figure 27:
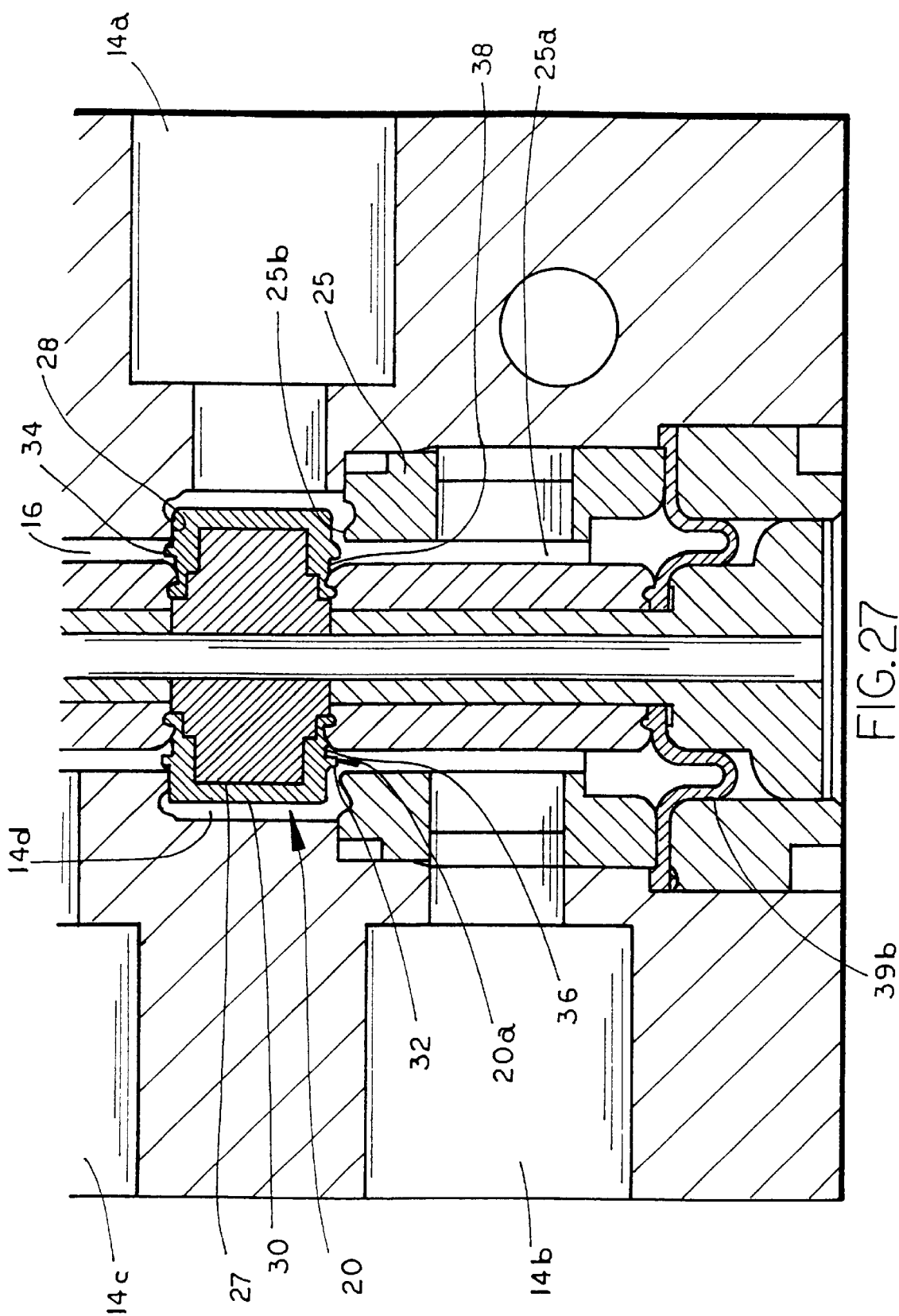
FIG. 27 is an enlarged partial cross-section view similar to FIG. 3 illustrating the poppet when the valve is in an energized and open condition.

As noted above poppet 20 includes a flexible sealing lip 20a to provide a radially seal in transverse passage 16. Referring to FIGS. 19–21, poppet 20 includes a relatively rigid frame or core 27, which is formed from a metal material, such as brass or stainless steel. Alternately, frame 27 may be formed from a plastic material, including a reinforced plastic, such as a mineral filled nylon or the like. Frame 27 comprising a generally annular-shaped body with a transverse opening 27a which extends along a central axis 27b and into which extension pin 23 extends to thereby mount poppet 20 to armature 21. Frame 27 also includes a pair of outwardly projecting flanges 27c and 27d onto which a sealing material, such as a Nitrile, including a 65±5 durometer Shore A Nitrile, is mounted, such as by molding to form a seal member 30, preferably a unitary seal.

Figure 28:
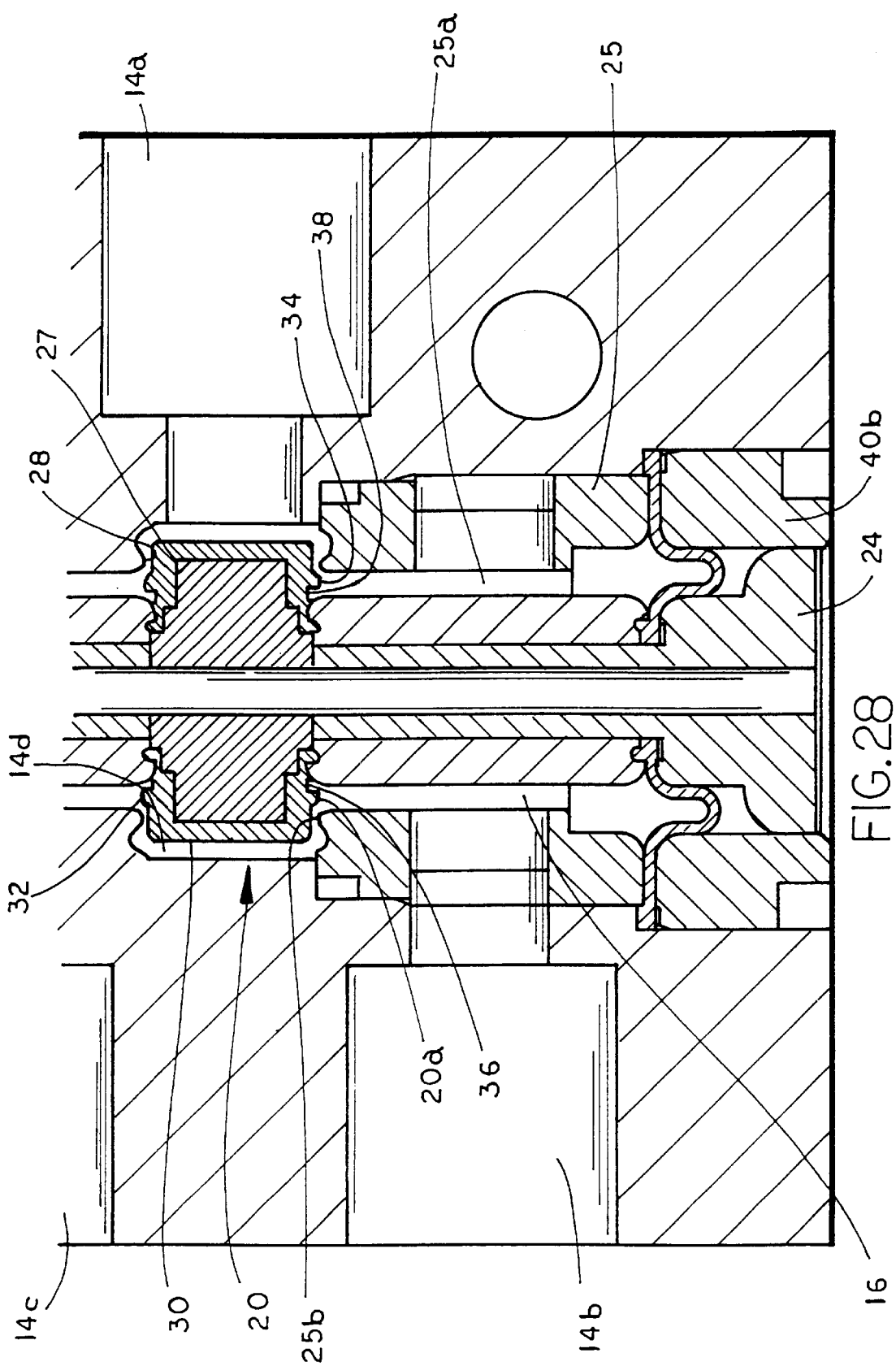
FIG. 28 is a similar view to FIG. 27 illustrating the poppet when the valve is de-energized and the poppet is in mid-stroke.
Figure 29:
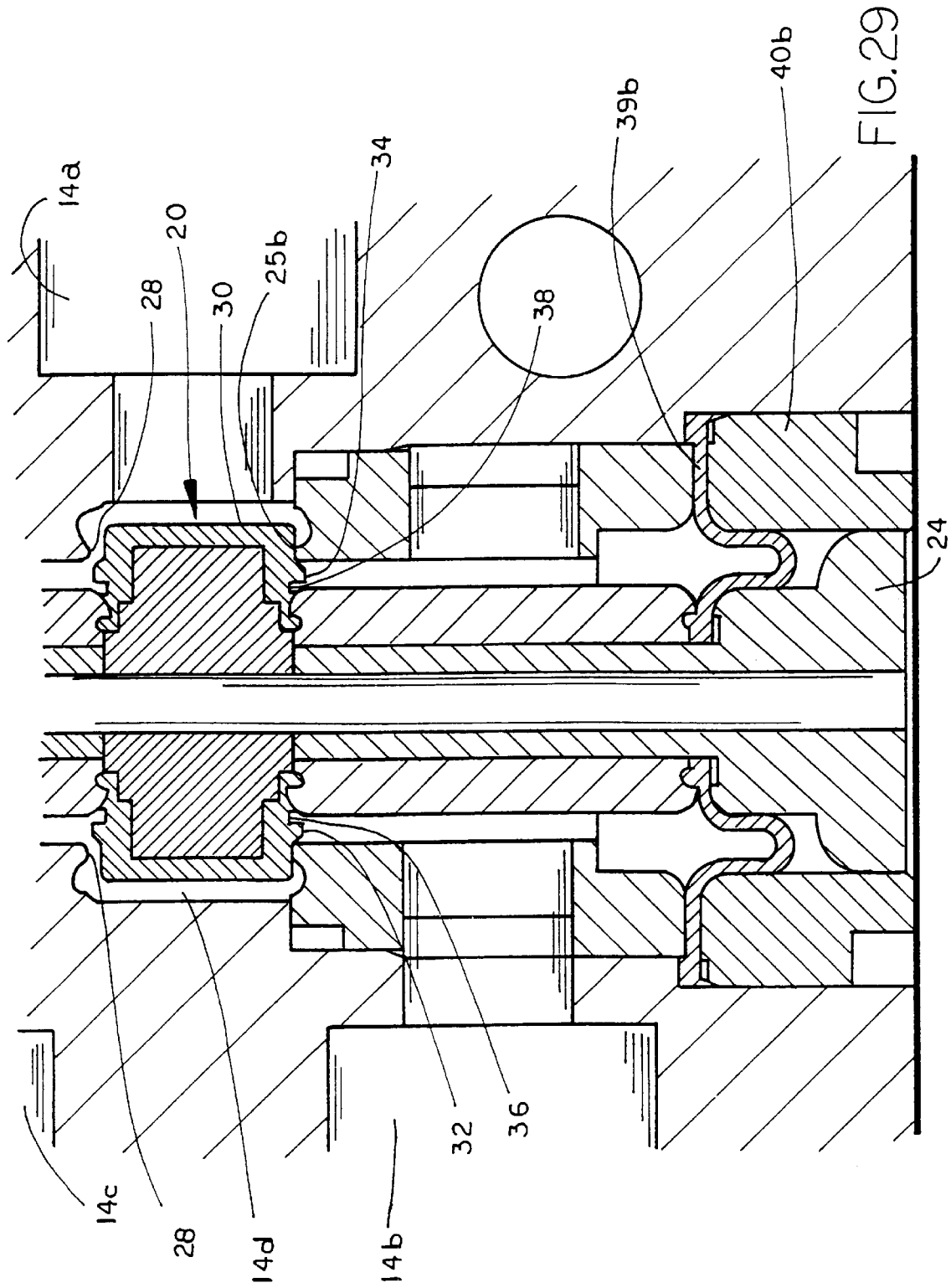
FIG. 29 is a similar view to FIGS. 27 and 28 illustrating the poppet when the valve is de-energized and the poppet makes initial contact on the fixed seat.
Figure 30:
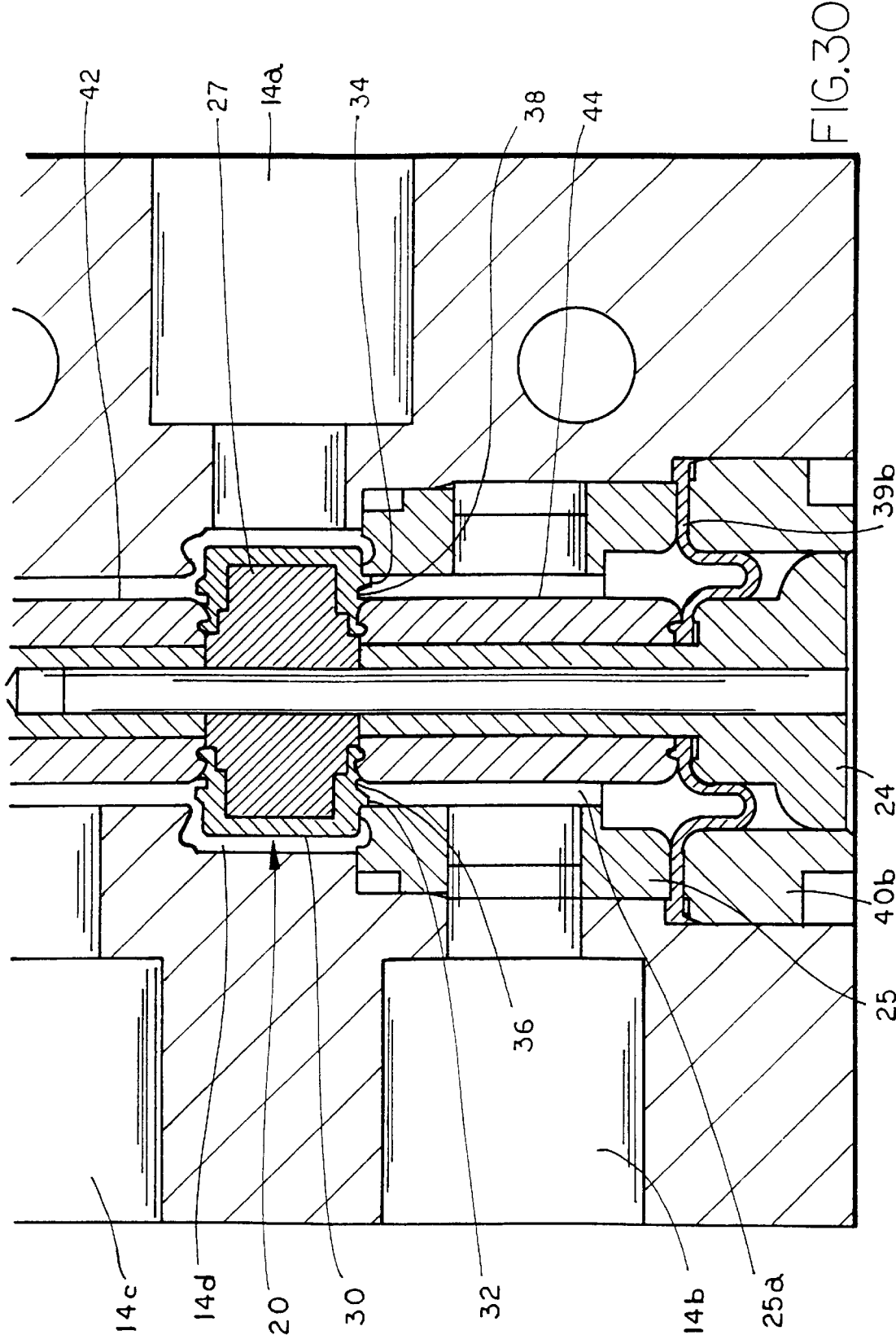
FIG. 30 is a similar view to FIGS. 27–29 illustrating the poppet when the valve is de-energized and the poppet lip is deflected and engaged radially against the valve seat with the valve completely sealed.

Referring to FIG. 28, seal member 30 has a generally E-shaped cross-section and includes upper and lower flexible annular lips or ridges 32 and 34, which have generally trapezoidal shaped cross-sections, which form flexible sealing lips 20a. In addition, seal member 30 includes a corresponding pair of annular grooves 36 and 38. Grooves 36 and 38 are spaced radially inward of ridges 32 and 34 and provide annular passages or cavities between poppet 20 and the annular surface of transverse passage 16 into which the pressurized fluid in valve assembly 10 can flow to assist in the sealing function.

As best seen in FIG. 27–30, when poppet 20 is moved to its open position, seal member 30 bears against upper ridge 28 of transverse passage 16, with lip 34 spaced radially inward of ridge 28. When poppet 20 is moved downward towards it closed position, seal member 30 bears on ridge 25b of valve seat insert 25. As poppet 20 is compressed against ridge 25b, lip 32, under the pressure of the pressurized fluid in inlet port 14b, flexes radially outward toward the inner surface of insert 25 defining transverse passage 25a to form a radial seal between poppet 20 and transverse passage 16. As a result, the air pressure within valve assembly 10 forces the sealing lip against valve seat 25 in a direction that is generally 90° to the axially motion of poppet 20. This radial sealing effect allows a large reduction of spring force. In other words, in order to achieve the same sealing pressure in a conventional valve assembly, the size of biasing member 13 may be reduced. With a lower spring rate, the amount of electromagnetic field generated by actuator 15 may likewise be reduced, which therefore lowers the power consumption of valve assembly 10. Thus, the amount of spring force that is required to seat or seal poppet 20 in the valve seat is greatly reduced over conventional designs that rely solely on the axial compression of a poppet against a valve seat.

Plunger assembly 18 is sealed in transverse passage by a pair of diaphragms 39a and 39b. Diaphragm 39a is mounted on extension pin 23 and spaced from poppet 20 by a retainer 42 (FIGS. 2, 3, 17, and 18). Similarly, diaphragm 39b is mounted on cylindrical sleeve 24b of poppet retainer 24 and spaced from poppet 20 by a second retainer 44. As best seen in FIGS. 17 and 18, retainers 42, 44 comprise tubular sleeves which sandwich the respective diaphragms against the shoulders of armature 21 and retainer 24. In addition, diaphragms 39a, 39b are sealed against the respective shoulders of base 14 and valve seat insert 25 by diaphragm retainers 40a and 40b (FIGS. 23–25, and 25A). Both diaphragms 39a, 39b include flexible central portions so that when plunger assembly 18 moves between its fully open position (see FIG. 27) and its fully closed position (FIG. 30), the medial or central portion of the diaphragms 39a and 39b flex with the movement of plunger assembly 18 to maintain a static seal between plunger assembly 16 and the respective diaphragms 39a and 39b and, further, between diaphragms 39a, 39b and base 14 and valve seat insert 25.

As noted above, plunger assembly 18 is moved between its respective open and closed positions by electromagnetic actuator 15. Referring again to FIGS. 2 and 3, electromagnetic actuator 15 includes a bobbin or spool 72, a coil frame 74, which supports bobbin 72 in housing 12, and a coil 76. Referring to FIGS. 4 and 5, bobbin 72 includes a pair of conductive contacts 78, 80, for coupling to an external power supply. Coil frame 74 is preferably a metal frame, such as a steel frame, and as best seen in FIG. 7, includes a base 82 and a top plate 84 between which coil 76 is supported. Bobbin 72 is formed from a nonconductive material, such as glass filled material, and includes a sleeve 86, which forms transverse sleeve 15a, and upper and lower flanges 88 and 89. Coil 76 extends around sleeve portion 86 and is captured between flanges 88 and 90 and is coupled to conductive contacts 78 and 80. When energized, coil 76 creates an electromagnetic field, which controls the movement of plunger assembly 18 in passage 16 as described above to control communication between inlet and outlet ports 14a and 14b. When coil 76 is energized, coil 76 urges plunger assembly 16 to move upward (as viewed in FIG. 3) to compress biasing member 13, which is positioned in transverse sleeve 15a. When coil 76 is de-energized, biasing member 13 urges plunger assembly 16 downward (as viewed in FIG. 3) so that poppet 18 moves to its closed position as more fully described above. It should be understood that use of the terms "up", "down", "upward", "downward", and variations thereof are merely used as a reference and are not intended to be limiting.

Figure 31:
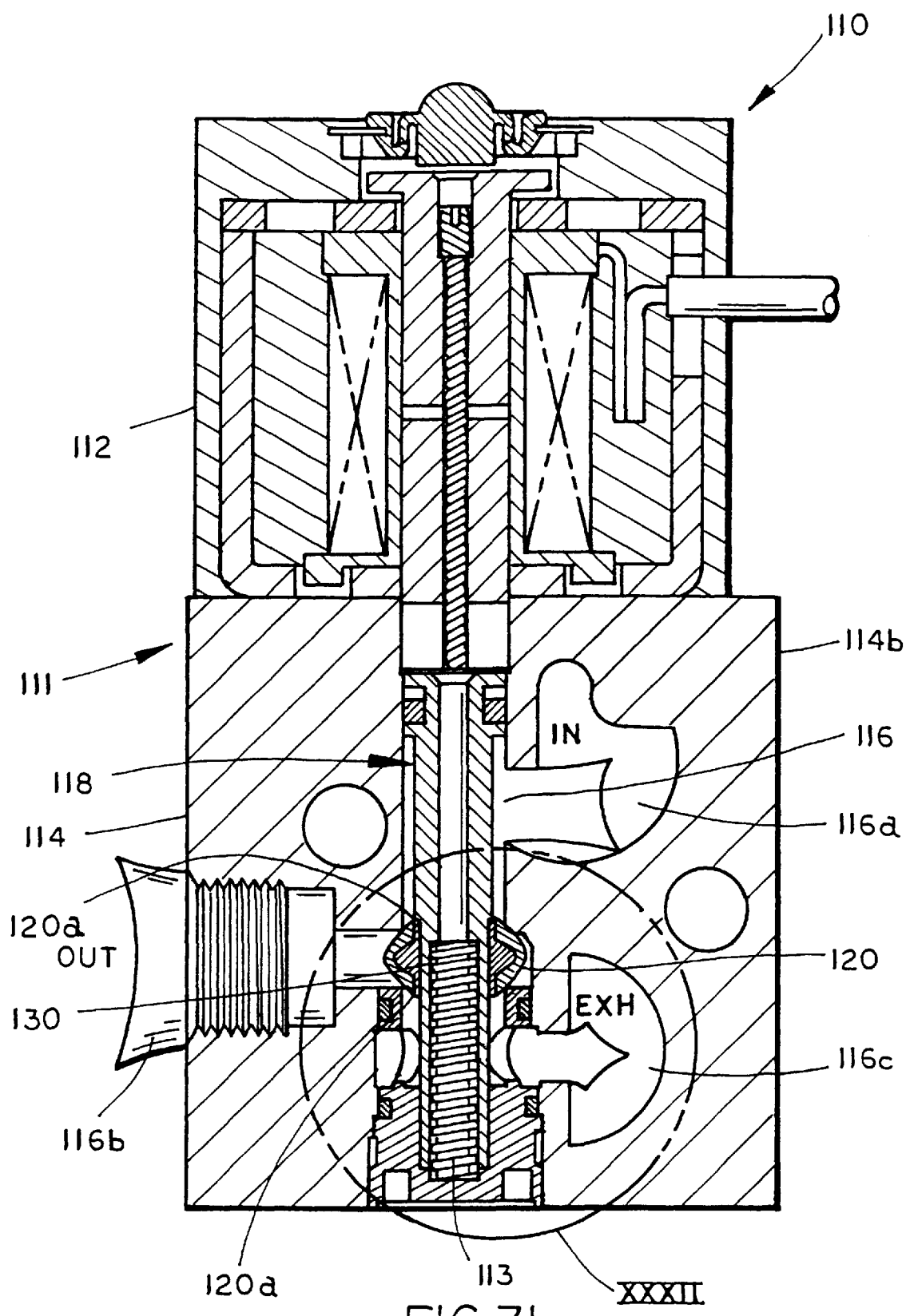
FIG. 31 is a similar view to FIG. 3 of another embodiment of the present invention.
Figure 32:
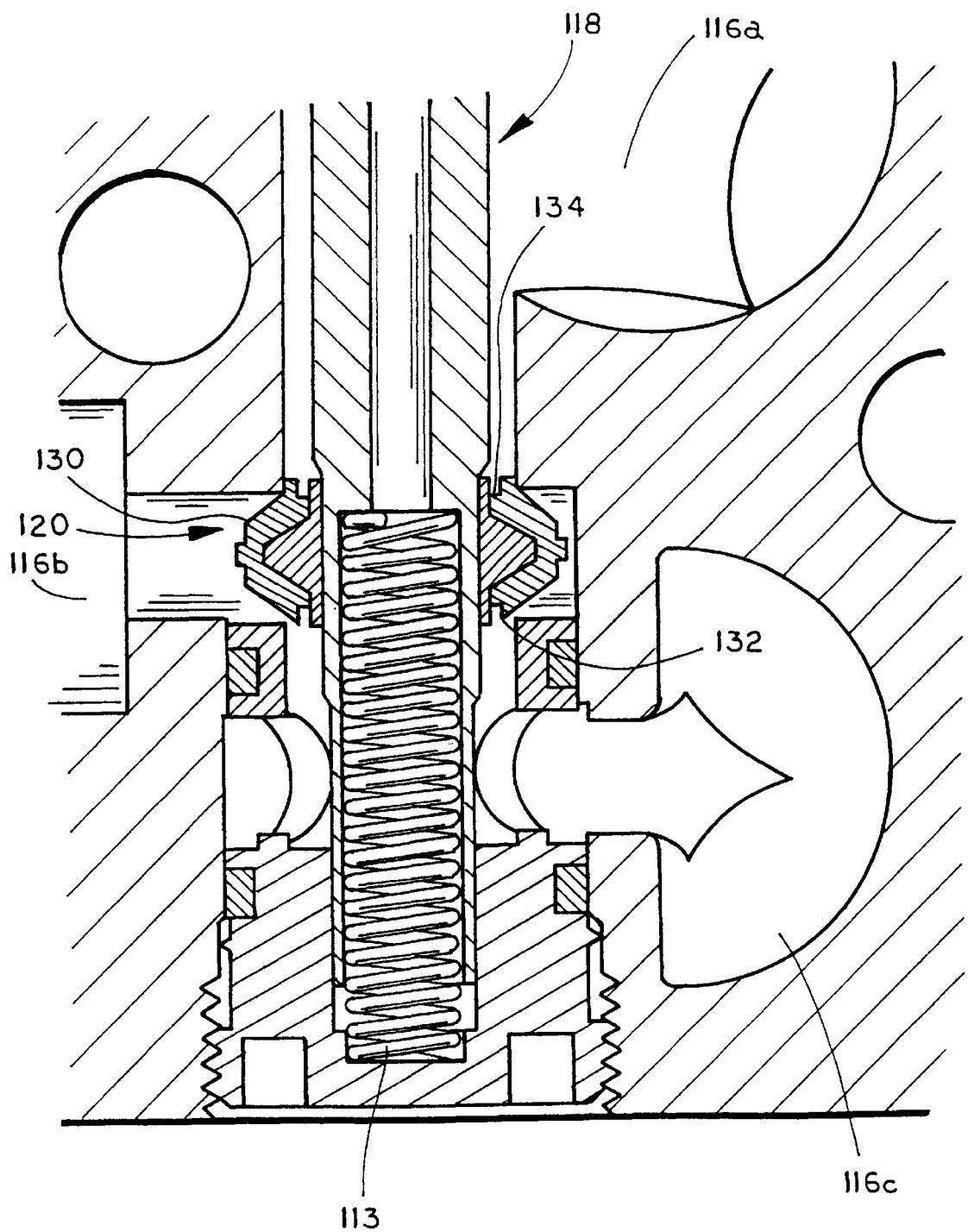
FIG. 32 is an enlarged view of FIG. 31 illustrating the poppet in the closed position.

Referring to FIGS. 31 and 32, the numeral 110 generally designates another embodiment of the valve assembly of the present invention. Valve assembly 110 includes a housing 111 formed from an upper housing member 112 and a lower housing or base 114. Similar to the previous embodiment, base 114 includes a transverse passage 116 which includes an inlet port 116a, an outlet port 116b, and an exhaust port 116c. Positioned in passage 116 is a plunger assembly 118 which includes a poppet 120 for sealing against body 114a of base 114 in passage 116 to control communication between inlet port 116a and outlet port 116b to thereby open and close valve assembly 110. Similar to poppet 20, poppet 120 incorporates a pair of flexible sealing lips 122 which provide a radial seal against body 114a to thereby reduce the amount of force that is required to achieve an effective seal between poppet 120 and body 114a, as will be more fully described below.

Plunger assembly 116 is supported for axial reciprocal movement in passage 116 and is urged into an upward closed position (shown in FIG. 32) by a biasing member 123 housed in base 114 and a downward open position, in which inlet port 116a and outlet port 116b are in communication, by an electromagnetic actuator 126 supported in upper housing 112. When energized, electromagnetic actuator 126 generates a magnetic field which moves plunger assembly 116 against the spring force of biasing member 124, similar to the previous embodiment, but in a downward direction.

As best seen in FIGS. 33–35, poppet 120 includes an annular frame or core 130, which has a generally triangular-shaped cross-section, and a unitary seal member 122 which is mounted to frame 130. Optionally, seal member 122 maybe molded with frame 130. Preferably, frame 130 is formed from a rigid material, such as metal, including brass, stainless steel, or the like, or may be formed from a plastic, such as reinforced nylon or the like. Seal member 122 comprises a sealing material, such as a 65±5 durometer Shore A nitrile, and has a generally cup-shaped cross-section. Similar to seal member 30 seal member 122 includes a pair of flexible lips 132 and 133 which project outwardly and in a direction generally parallel to the longitudinal axis of passage 116. In addition, seal member 122 includes annular grooves 134 and 136 which are spaced radially inward from lips 132 and 133 to allow pressurized fluid in passage 116 to urge lips 132 and 133 to flex radially outward to provide a radial seal, similar to the previous embodiment. For other general details of the remaining components in valve assembly 110, reference is made to the first embodiment, and to HUMPHREY VALVE 310, available from Humphrey Products of Kalamazoo, Mich.

While several forms of the invention have been shown and described, other forms will now be apparent to those skilled in the art. For example, the seal members, poppet frames, and flexible lips may have different cross-sections than those in the illustrated embodiments. In addition, the poppet of the present invention may be incorporated into a wide variety of valve bodies. The valve assemblies illustrated herein are for illustrative purposes only and are used merely as examples of suitable applications of the poppet of the present invention. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

I claim:

1. An electrically-operated plunger-type valve assembly comprising:

a housing having an interior chamber, an inlet port, and an outlet port, said interior chamber having a communication passage between said inlet port and said outlet port;

an electromagnetic actuator positioned in said interior chamber;

a plunger assembly positioned in said interior chamber and supported for reciprocal axial movement in said interior chamber between a first position and a second position, said communication passage being open to permit communication between said inlet port and said outlet port when said plunger assembly is moved to said first position thereby opening said valve assembly, and said communication passage being closed between said inlet port and said outlet port when said plunger assembly is moved to said second position whereby said valve assembly is closed; and a biasing member applying a spring force to said plunger assembly to urge said plunger assembly to said second position, said electromagnetic actuator generating a magnetic field having sufficient magnitude to move said plunger assembly against said force of said biasing member to move said plunger assembly to said first position when said electromagnetic actuator is energized to selectively move said plunger assembly between said first and second positions to control the communication between said inlet port and said outlet port, and said plunger assembly having a seal member sealing said communication passage to close communication between said inlet port and said outlet port when said plunger assembly is moved to said second position, and said seal member being acted upon by pressurized fluid in said inlet port to radially seal against said communication passage whereby said spring force of said biasing member can be reduced which in turn reduces the amount of energy needed to move said plunger assembly between said first and second positions.

2. The electrically-operated plunger-type valve assembly according to claim 1, wherein said electromagnetic actuator includes a spool and a wire coiled around said spool, and said wire generating said electromagnetic field when said wire is energized.

3. The electrically-operated plunger-type valve assembly according to claim 1, wherein said seal member includes a projecting member, said projecting member radially sealingly engaging said communication passage to close communication between said inlet port and said outlet port when said plunger assembly is moved to said second position.

4. The electrically-operated plunger-type valve assembly according to claim 3, wherein said projecting member deflects radially outward to sealingly engage said communication passage.

5. The electrically-operated plunger-type valve assembly according to claim 4, wherein said projecting member comprises an annular lip.

6. The electrically-operated plunger-type valve assembly according to claim 1, wherein said interior chamber includes a valve seat insert positioned therein, said valve seat insert having a transverse passage forming a portion of said communication passage, and said valve seat insert having a raised portion, and said seal member sealing against at least said raised portion when said plunger assembly is moved to said second position.

7. The electrically-operated plunger-type valve assembly according to claim 6, wherein said seal member includes a projecting member, said projecting member sealingly engaging a wall of said transverse passage.

8. The electrically-operated plunger-type valve assembly according to claim 7, wherein said projecting member deflects radially outward to sealingly engage said wall.

9. The electrically-operated plunger-type valve assembly according to claim 8, wherein said raised portion is positioned radially outwardly of said projecting member of said seal member.

10. The electrically-operated plunger-type valve assembly according to claim 1, wherein said housing further includes an exhaust port, said communication passage extending between said inlet port, said outlet port, and said exhaust port, and said seal member sealingly engaging a first portion of said communication passage when said plunger assembly is in said first position to seal off said exhaust port and to open communication between said inlet port and said outlet port to thereby open said valve assembly, and said seal member sealingly engaging a second portion of said communication passage when said plunger assembly is in said second position to seal off communication between said inlet port and said outlet port.

11. The electrically-operated plunger-type valve assembly according to claim 10, wherein said seal member comprises a unitary seal and includes a first sealing surface for sealingly engaging said first portion and a second sealing surface for sealingly engaging said second portion.

12. The electrically-operated plunger-type valve assembly according to claim 11, wherein at least one of said first sealing surface and said second sealing surface comprises a projecting lip.

13. The electrically-operated plunger-type valve assembly according to claim 12, wherein each of said first sealing surface and said second sealing surface comprises a projecting lip.

14. The electrically-operated plunger-type valve assembly according to claim 13, wherein at least said projecting lip of said second sealing surface deflects to sealingly engage said second portion.

15. The electrically-operated plunger-type valve assembly according to claim 14, wherein said projecting lip of said second sealing surface deflects radially outward to sealingly engage said second portion.

16. The electrically-operated plunger-type valve assembly according to claim 15, wherein said interior chamber includes a valve seat insert positioned therein, said valve seat insert having a transverse passage forming said second portion of said communication passage, and said valve seat insert having a raised portion at said second portion, and said second sealing surface sealing against at least said raised portion when said plunger assembly is moved to said second position.

17. The electrically-operated plunger-type valve assembly according to claim 16, wherein said projecting lip of said second sealing surface sealingly engaging an inner wall of said transverse passage when said plunger assembly is moved to said second position.

18. The electrically-operated plunger-type valve assembly according to claim 17, wherein said projecting lip deflects radially outward to sealingly engage said wall.

19. The electrically-operated plunger-type valve assembly according to claim 18, wherein said raised portion of said second portion is positioned radially outwardly of said projecting lip of said second sealing surface.

20. An electrically-operated plunger-type valve assembly comprising:
   a housing having an interior chamber, an inlet port, an outlet port, and an exhaust port, said interior chamber having a communication passage between said inlet port, said outlet port, and said exhaust port;
   an electromagnetic actuator positioned in said interior chamber;
   a plunger assembly positioned in said interior chamber and supported for reciprocal axial movement in said interior chamber between a first position and a second position, said communication passage between said inlet port and said outlet port being open when said plunger assembly is moved to said first position thereby opening said valve assembly, and said communication passage between said inlet port and said outlet port and said exhaust port being open when said plunger assembly is moving to said second position, and said communication passage between said inlet port and said outlet port and said exhaust port being closed when said plunger assembly is moved to said second position whereby said valve assembly is closed; and
   a biasing member applying a spring force to said plunger assembly to urge said plunger assembly to said second position, said electromagnetic actuator generating a magnetic field having sufficient magnitude to move said plunger assembly against said force of said biasing member to move said plunger assembly to said first position when said electromagnetic actuator is energized to selectively move said plunger assembly between said first and second positions to control opening and closing of said valve assembly, and said plunger assembly having a sealing member having first and second sealing surfaces for sealing said communication passage when in said first and second positions, respectively, and at least said second sealing surface radially sealingly engaging said communication passage and being acted upon by pressurized fluid in said inlet port to radially seal against said communication passage whereby said spring force of said biasing member can be reduced which in turn reduces the amount of energy need to move said plunger assembly between its first and second positions.

21. The electrically-operated plunger-type valve assembly according to claim 20, wherein at least said second sealing surface comprises a flexible lip.

22. The electrically-operated plunger-type valve assembly according to claim 21, wherein each of said first sealing surface and said second sealing surface comprises a flexible lip.

23. The electrically-operated plunger-type valve assembly according to claim 21, wherein said flexible lip deflects radially outward to sealingly engage said communication passage.

24. The electrically-operated plunger-type valve assembly according to claim 23, wherein said sealing member includes an annular groove radially inward of said flexible lip whereby the pressure of the pressurized fluid enters said annular groove to urge said second sealing surface to deflect radially outward to sealingly engage said communication passage.

25. The electrically-operated plunger-type valve assembly according to claim 24, wherein said interior chamber includes a valve seat insert positioned therein, said valve seat insert having a transverse passage forming first and second axially spaced portions of said communication passage, said first sealing surface sealingly engaging said first portion when said plunger assembly is in said first position, and said second sealing surface sealing against said second portion when said plunger assembly is moved to said second position.

26. The electrically-operated plunger-type valve assembly according to claim 25, wherein said flexible lip of said second sealing surface sealingly engaging a wall of said transverse passage when said plunger assembly is moved to said second position.

27. The electrically-operated plunger-type valve assembly according to claim 25, wherein at least said second portion of said transverse passage has a raised portion, and said second sealing surface engaging at least said raised portion to thereby sealingly engage said second portion.

28. The electrically-operated plunger-type valve assembly according to claim 25, wherein said seal member comprises a unitary seal and includes a first sealing surface for sealingly engaging said first portion and a second sealing surface for sealingly engaging said second portion.

29. The electrically-operated plunger-type valve assembly according to claim 28, wherein said flexible lip comprises an annular flexible lip.

30. An electrically-operated plunger-type valve poppet comprising:
 a rigid frame having a generally annular-shaped body, said generally annular-shaped body including a central opening having a central axis about which said generally annular-shaped body extends; and
 a generally annular-shaped seal member supported by said frame, said seal member having at least one flexible annular lip extending generally parallel to said central axis for forming a flexible sealing surface which deflects radially outward when mounted in a valve assembly and when said flexible annular lip is acted upon by pressurized fluid in the valve assembly.

31. The electrically-operated plunger-type valve poppet according to claim 30, wherein said flexible annular lip has a generally trapezoidal-shaped cross-section.

32. The electrically-operated plunger-type valve poppet according to claim 30, wherein seal member includes a groove radially inward of said flexible annular lip, said groove forming a cavity into which pressurized fluid in the valve assembly flows to assist in the sealing function of said poppet.

33. The electrically-operated plunger-type valve poppet according to claim 32, wherein said groove comprises an annular groove.

34. The electrically-operated plunger-type valve poppet according to claim 30, wherein said seal member has a generally channel-shaped cross-section.

35. The electrically-operated plunger-type valve poppet according to claim 30, wherein said seal member has a generally E-shaped cross-section.

36. The electrically-operated plunger-type valve poppet according to claim 30, wherein said seal member includes a generally cup-shaped cross-section.

37. An electrically-operated plunger-type valve assembly comprising:
 an upper housing defining an interior chamber;
 a base mounted to said housing, said base including an inlet port, an outlet port, and an exhaust port, said base further including a communication passage between said inlet port, said outlet port, and said exhaust port;
 a coil assembly positioned in said interior chamber and being adapted to be selectively energized to generate a magnetic field, said coil assembly having a transverse passage therethrough;
 a plunger positioned in said communication passage and extending into said transverse passage of said coil assembly, said plunger assembly being supported for reciprocal axial movement in said communication passage between a first position wherein said plunger assembly seals said exhaust passage and allows communication between said inlet port and said outlet port thereby opening said valve assembly and a second position wherein said plunger assembly seals said inlet opening whereby said valve assembly is closed; and
 a biasing member applying a spring force to said plunger assembly to urge said plunger assembly to said second position, said coil assembly generating a magnetic field having sufficient magnitude to move said plunger assembly against said force of said biasing member to move said plunger assembly to said first position when said coil assembly is energized to selectively move said plunger assembly between said first and second positions to control the communication between said inlet port, said outlet port, and said exhaust port, said plunger assembly including a poppet, said poppet comprising:
 a rigid frame having a generally annular-shaped body, said generally annular-shaped body having a central opening with a central axis about which said generally annular-shaped body extends; and
 a generally annular-shaped seal member supported by said frame, said seal member having at least one flexible annular lip extending generally parallel to said central axis for forming a flexible sealing surface which deflects radially outward when said plunger assembly is moved to said second positioning, said flexible annular lip being acted upon by pressurized fluid in said valve assembly to thereby sealingly engage said communication passage when said plunger assembly is in second position.

38. The electrically-operated plunger-type valve assembly according to claim 37, wherein said flexible annular lip has a generally trapezoidal-shaped cross-section.

39. The electrically-operated plunger-type valve assembly according to claim 37, wherein seal member includes a groove radially inward of said flexible annular lip, said groove forming a cavity into which pressurized fluid in the valve assembly flows to assist in the sealing function of said poppet.

40. The electrically-operated plunger-type valve assembly according to claim 39, wherein said groove comprises an annular groove.

41. The electrically-operated plunger-type valve assembly according to claim 37, wherein said seal member has a generally channel-shaped cross-section.

42. The electrically-operated plunger-type valve assembly according to claim 37, wherein said seal member has a generally E-shaped cross-section.

43. The electrically-operated plunger-type valve assembly according to claim 37, wherein said seal member includes a generally cup-shaped cross-section.

* * * * *